US008797920B2

(12) United States Patent
Parreira

(10) Patent No.: US 8,797,920 B2
(45) Date of Patent: Aug. 5, 2014

(54) METHODS AND SYSTEMS FOR ACCESS TO REAL-TIME FULL-DUPLEX WEB COMMUNICATIONS PLATFORMS

(75) Inventor: Andre T. Parreira, Odivelas (PT)

(73) Assignee: IBT—Internet Business Technologies, Odivelas (PT)

( * ) Notice: Subject to any disclaimer, the term of this patent is extended or adjusted under 35 U.S.C. 154(b) by 99 days.

(21) Appl. No.: 13/411,430

(22) Filed: Mar. 2, 2012

(65) Prior Publication Data

US 2013/0058262 A1    Mar. 7, 2013

Related U.S. Application Data

(60) Provisional application No. 61/477,579, filed on Apr. 20, 2011, provisional application No. 61/477,575, filed on Apr. 20, 2011, provisional application No. 61/477,577, filed on Apr. 20, 2011.

(51) Int. Cl.
    *H04L 5/14* (2006.01)
(52) U.S. Cl.
    USPC ............................................. 370/276
(58) Field of Classification Search
    USPC .................. 370/254–350; 709/201–213
    See application file for complete search history.

(56) References Cited

U.S. PATENT DOCUMENTS

| 6,393,407 | B1 | 5/2002 | Middleton, III et al. |
| 8,196,155 | B2* | 6/2012 | Huang et al. ............. 719/328 |
| 8,301,718 | B2* | 10/2012 | Macken ..................... 709/216 |
| 2003/0041050 | A1 | 2/2003 | Smith et al. |
| 2006/0143086 | A1 | 6/2006 | Macartney-Filgate et al. |
| 2009/0177538 | A1 | 7/2009 | Brewer et al. |
| 2010/0114994 | A1* | 5/2010 | Huang et al. ............. 707/811 |
| 2011/0212717 | A1* | 9/2011 | Rhoads et al. ............ 455/420 |

OTHER PUBLICATIONS

Co-pending U.S. Appl. No. 13/445,622 by Parreira, A. T., filed Apr. 12, 2012.
Co-pending U.S. Appl. No. 13/445,649 by Parreira, A. T., filed Apr. 12, 2012.
Co-pending U.S. Appl. No. 13/573,768 by Parreira, A. T., filed Oct. 3, 2012.
International Search Report and Written Opinion for International Patent Application No. PCT/IB2012/002599 mailed May 16, 2013, 9 pp.

* cited by examiner

*Primary Examiner* — Ayaz Sheikh
*Assistant Examiner* — Debebe Asefa
(74) *Attorney, Agent, or Firm* — Perkins Coie LLP

(57) ABSTRACT

At least one embodiment of this invention pertains to an abstraction layer that provides a consistent interface, with client-side and server-side implementations, to allow web client to interact with other web clients (that are connected to a common interactive event) in real-time over standard web ports without the web clients being tied to a specific real-time communications platform. At least some embodiments described herein contemplate methods and systems for establishing web communication among multiple web clients by providing a layer of abstraction between the web clients and the interactive session using interfaces to an Open Real-Time Connectivity (ORTC) layer. The system may use authentication methods to validate the web communications. The system may be implemented on a scalable, load-balanced, and fault-tolerant network.

30 Claims, 11 Drawing Sheets

METHODS AND SYSTEMS FOR ACCESS TO REAL-TIME FULL-DUPLEX WEB COMMUNICATIONS PLATFORMS

CROSS REFERENCE TO RELATED APPLICATIONS

This patent application claims priority to U.S. Provisional Patent Application No. 61/477,579, entitled METHOD, SYSTEM AND PRODUCTS FOR STANDARDIZED ACCESS TO REAL-TIME FULL-DUPLEX WEB COMMUNICATIONS PLATFORM, filed Apr. 20, 2011, the entire contents of which are incorporated herein its entirety.

This patent application is further related to the technologies described in the following patents and applications, all of which are incorporated herein in their entireties:
U.S. Patent Application No. 61/477,575, entitled METHOD, SYSTEM AND PRODUCTS FOR STANDARDIZED xRTML-MARKUP LANGUAGE FOR REAL-TIME WEB CONTENT PUBLISHING, filed Apr. 20, 2011; and
U.S. Patent Application No. 61/477,577, entitled METHODS, SYSTEMS AND PRODUCTS FOR REAL-TIME TRACKING AND MARKETING INTERACTION WITH WEB APPLICATION USERS, filed Apr. 20, 2011.

FIELD

This description generally relates to interactive web communication. More particularly, it relates to methods and systems for providing standardized access in a real-time full-duplex web communications platform.

BACKGROUND

In the constantly evolving world of web communications, where information has to be deployed quickly and reliably, full-duplex communication in websites is key for improving customer experience and decreasing the amount of requests to web servers in order to obtain the most current data update. Consider a scenario within an auction website, where several users follow bids related to a specific item. FIG. 1A illustrates such a scenario.

As illustrated in FIG. 1A, each client device (e.g., 102A, 102B, 102C) transmits a request (e.g., an AJAX request) to the web server 104 at periodic intervals (e.g., every second) to obtain information related to the latest bid or any other updates to the auction. If there is no bid or other status update for 1 minute, 60 requests per user are sent and handled by the server when in fact there is no change in status. This architecture imposes a huge load on the web server and uses a lot of bandwidth due, for example, overhead associated with HTTP GET headers.

To avoid such a cumbersome load on the servers, an improved scenario would be for the server to broadcast (push) information related to latest bids or other such updates to all the users when a new bid is placed. FIG. 1B depicts such scenario. Here, each client receives an update through a direct connection with a full-duplex underlying platform (e.g., an HTML5 WebSocket platform). However, even such an improved scenario presents bandwidth strains on the web server and other related issues as will be explained in the following detailed description.

Securing this full-duplex communications over an open network such as the internet is mandatory for most applications. At the same time this full-duplex communications demand the use of persistent connections between the servers and the users, bringing new challenges to the systems scalability especially in websites with millions of concurrent users exchanging billions of messages.

Overall, the examples herein of some prior or related systems and their associated limitations are intended to be illustrative and not exclusive. Other limitations of existing or prior systems will become apparent to those of skill in the art upon reading the following Detailed Description.

SUMMARY OF THE DESCRIPTION

At least one embodiment of this invention pertains to an abstraction layer that provides a consistent interface, with client-side and server-side implementations, to allow web client to interact with other web clients (that are connected to a common interactive event) in real-time over standard web ports without the web clients being tied to a specific real-time communications platform. At least some embodiments described herein contemplate methods and systems for establishing web communication among multiple web clients by providing a layer of abstraction between the web clients and the interactive session using interfaces to an Open Real-Time Connectivity (ORTC) layer. The web clients and server associated with the interactive event incorporate ORTC interface calls within their implementations and utilize the ORTC layer for connection to an underlying communication platform. In illustrative embodiments, the ORTC layer causes "listen" channels to be established for each connected web client within the underlying communication platform, and causes updates received from any client to be directly intercepted by the listen channels associated with the ORTC layer. In at least some embodiments, the described methods and systems contemplate a scenario where the ORTC layer causes updates to be directly broadcast and received in a common platform (e.g., without waiting to receive specific updates pushed by the server), further alleviating bandwidth strains on the server.

Another embodiment of this invention pertains to a method for establishing web communication. The method comprising: receiving, at an authentication server, an initial request from a client to connect to a communication channel hosted by a realtime server; generating, by the authentication server, an authentication token and one or more permissions; transmitting, to the client and a real-time server, the authentication token and the permissions; sending, to the real-time server, a connection message including the authentication token; generating, by the real-time server, a channel signature including a channel ID; transmitting, to the client, the channel signature; sending, to the real-time server, a request including the authentication token and the channel signature to connect to the communication channel; and connecting the client to the communication channel, by an Open Real-Time Connectivity (ORTC) interface, if a second channel signature calculated based the authentication token matches the channel signature.

Yet Another embodiment of this invention pertains to a method of relaying messages in a tree topology network of nodes, the method comprising: receiving, at a first node in the tree topology network, a subscribe request from a client to subscribe a communication channel; relaying, through the tree topology network, the subscribe request to a top node of the tree topology network; recording the subscribe request in caches of all nodes participating the subscribe request relaying; receiving, at a second node in the tree topology network, a publish request from a publisher to publish a message to the communication channel; relaying, through the tree topology network, the publish request to the top node of the tree topology network; identifying at least the first node that subscribed the communication channel, based on the caches of the nodes;

and relaying the message, through the tree topology network, by an Open Real-Time Connectivity (ORTC) interface, to the first node.

Other advantages and features will become apparent from the following description and claims. It should be understood that the description and specific examples are intended for purposes of illustration only and not intended to limit the scope of the present disclosure.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

The headings provided herein are for convenience only and do not necessarily affect the scope or meaning of the claimed invention.

Figure 2:
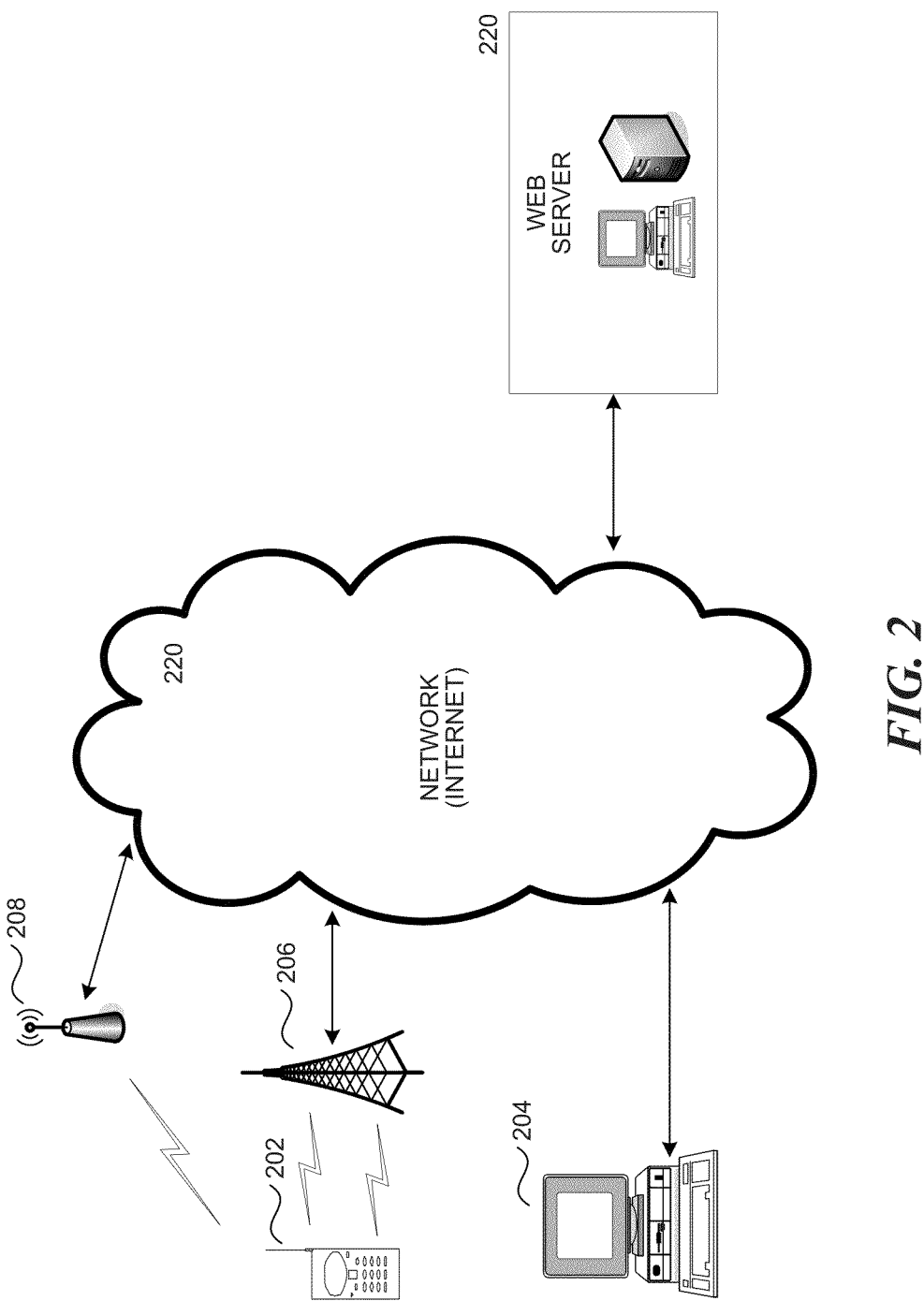
FIG. 2 and the following discussion provide a brief, general description of a representative environment in which the invention can be implemented

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION OF THE INVENTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1 and the following discussion provide a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1, a user may use a personal computing device (e.g., a phone 202, a personal computer 204, etc.) to communicate with a network. The term "phone," as used herein, may be a cell phone, a personal digital assistant (PDA), a portable email device (e.g., a Blackberry®), a portable media player (e.g., an IPod Touch®), or any other device having communication capability to connect to the network. In one example, the phone 202 connects using one or more cellular transceivers or base station antennas 206 (in cellular implementations), access points, terminal adapters, routers or modems 208 (in IP-based telecommunications implementations), or combinations of the foregoing (in converged network embodiments).

In some instances, the network 210 is the Internet, allowing the phone 202 (with, for example, WiFi capability) or the personal computer 204 to access web content offered through various web servers. In some instances, especially where the phone 202 is used to access web content through the network 210 (e.g., when a 3G or an LTE service of the phone 102 is used to connect to the network 110), the network 210 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

In some instances, a user uses one of the personal computing devices (e.g., the phone 202, the personal computer 204, etc.) to connect to a web server 120 over the network 110. A web server, as defined herein, refers to any computing device that hosts or operates data pertaining to a website. In one example, the web server 120 is a server operates by an online clothing store company. In such an example, the web server 120 has local or remote access to a database comprising the online store's catalog of products and pricing information. The web server 120 may also include information, in the form of a database of scripts or high-level languages, relevant to receiving user input over the input and responding with content pertinent to the user's input. For example, if a user requests samples of a particular designer shirt, the web server 120 includes capability to retrieve the relevant designer information and products from the database and return the information to the requesting client such that the information is displayed on the user's personal computing device. The web server 120 also includes code relevant to hosting the web site and managing all interactive actions related to the hosted web site. In another example, the web server operates an interactive online networking model, where several users may operate concurrently in an interactive session.

Figure 1A:
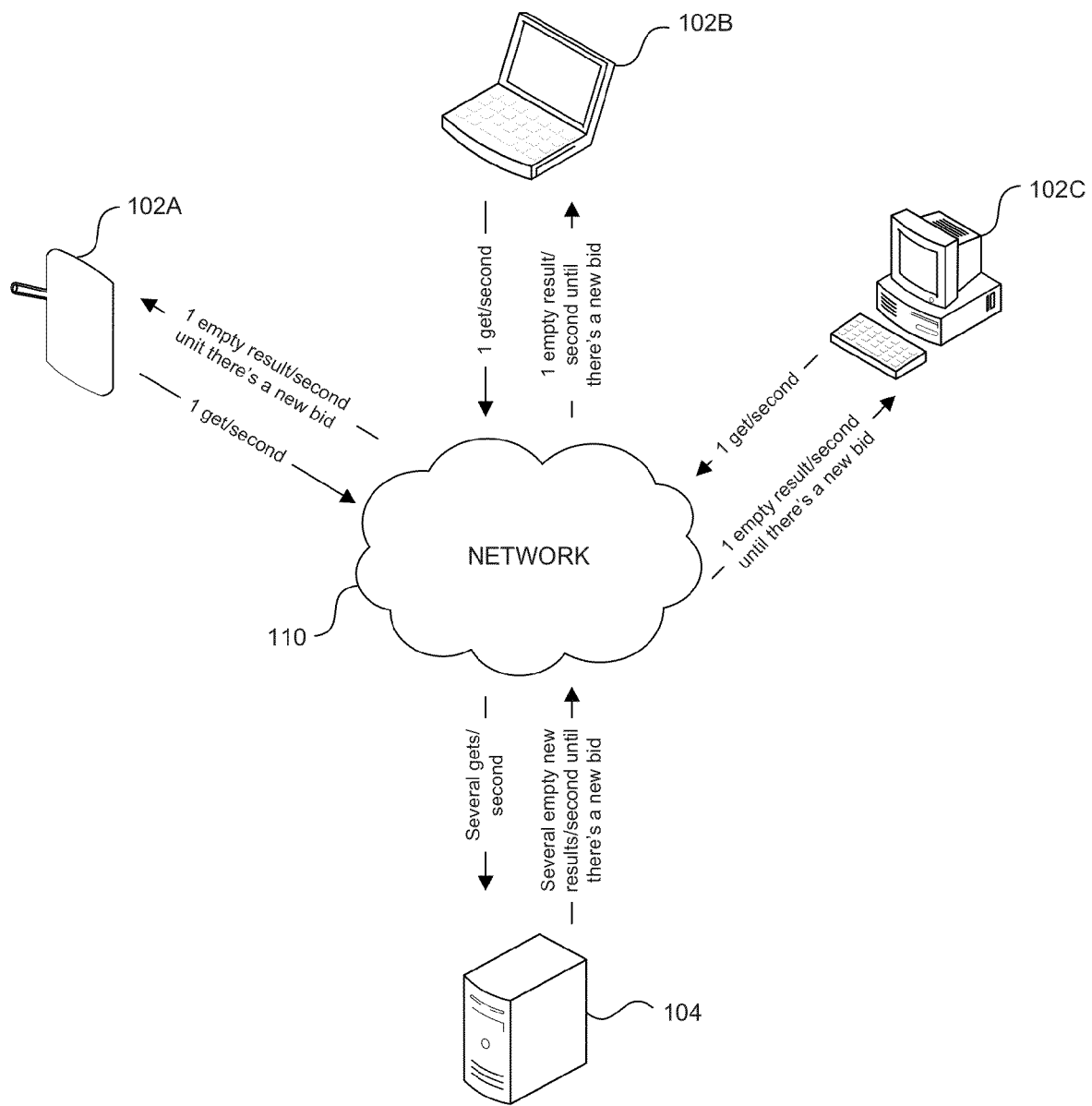
FIGS. 1A and 1B illustrate prior art systems of communication between web clients and a server for implementation of an interactive event.
Figure 1B:
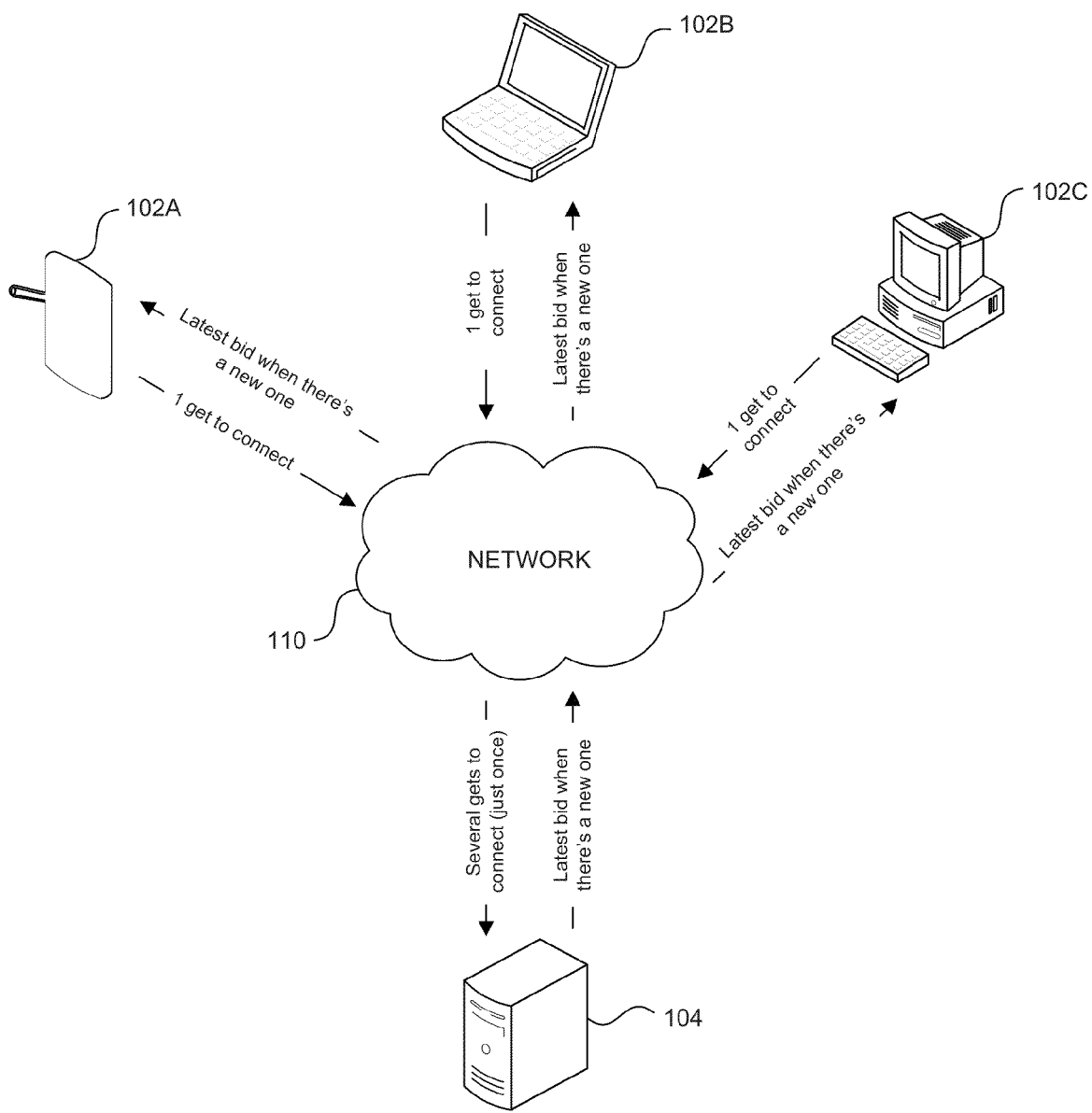

An illustrative example of such an interactive session is an auction web site (such as, for example, ebay.com). Here, the web server 120 may operate numerous interactive sessions. An interactive session, as defined herein, refers to each session in which multiple users interact with reference to a particular item of interest. For example, a first interactive session may be an online auction relating to the sale of an antique vase. Every user of the web site that signs in or connects in to view the auction relating to that particular antique vase is in a common interactive session. In such an interactive session, actions made by each user that affect a change in status of the session needs to be constantly refreshed and updated within the views of each user of the session. To explain this in an illustrative example, consider a scenario where three users are connected to a page that displays the status the auction for the antique vase. If any of the users makes a bid, the user's name or identity, along with a current bidding amount will need to be updated, and the interactive session showing the update will need to be refreshed in each page. FIGS. 1A and 1B, as explained in the background, illustrate exemplary methodologies used by servers to push out the updates to each of the connected clients. In the prior art discussed in the background section, the clients seldom communicate directly or have any medium for interaction without primary interaction with the web server 220 to receive updates relating to updates or status changes in the interactive session hosted by the web server 220. Several known method exist to establish such interactive communication between the web server 220 and the clients. For example, full-duplex web communication platforms (e.g., HTML5 Websocket) enable duplex communication between the clients and the web server 220, allowing the clients to transmit instructions (e.g., placing a bid) and receive updates (e.g., refreshed pages or information within pages upon another client placing a bid).

As will be explained in more detail below, in one embodiment, the techniques described herein introduce a layer of abstraction to the underlying web communication platform (simply, "communication platform"). Such an abstraction layer, introduced as the Open Real-Time Connectivity (ORTC) layer, presents several advantages. In such embodiments, the web site (and corresponding web pages) corresponding to the dynamic session operated by the web server 220 include interfaces (e.g., APIs) to a base ORTC layer. Upon interfacing, through ORTC interfaces, with the ORTC layer, the web pages are ORTC enabled and operate via the ORTC layer to establish communication with the underlying communication platform. There are several advantages in having such an abstraction layer. One advantage is that the web server 220 may change the underlying communication platform (e.g., when there are updates or newer and advanced platforms) without having to change the web site architecture (e.g., without changing code relevant to the operation of the interactive session). Another advantage is that, in certain implementations, information related to updates to interactive sessions are broadcast and captured directly via the ORTC interfaces associated with the web clients, without requiring any update pushed out from the web server. Additionally, the web client does not have to repeatedly request or look for updates from the server. Instead, the web client automatically receives an update message through the ORTC layer, thus conserving considerable bandwidth resources that would have originally been spent on continuously querying the web server 220.

Figure 3:
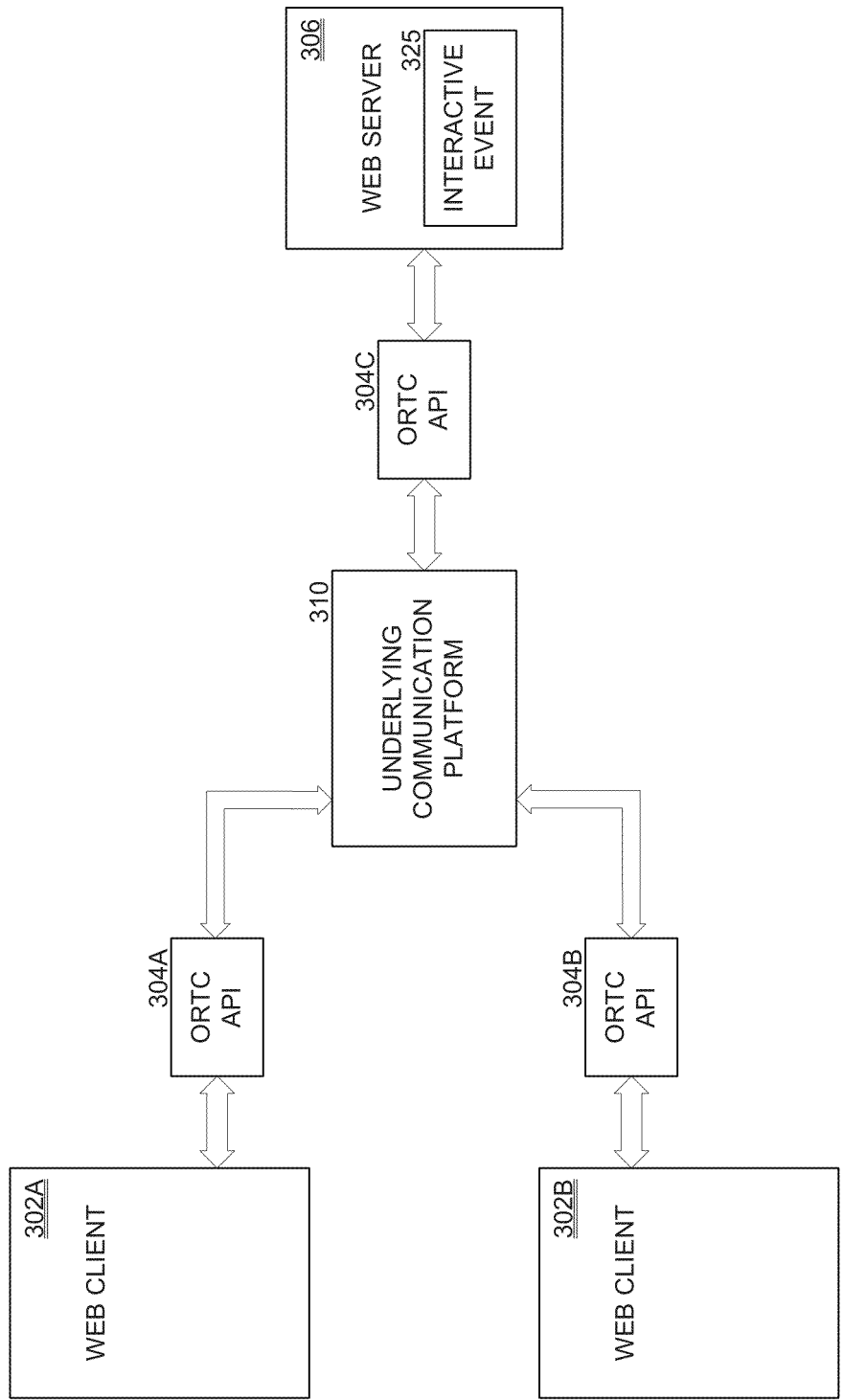
FIG. 3 is a block diagram illustrating components used to provide real-time full-duplex communication between two web clients using the ORTC abstraction layer.

FIG. 3 provides an illustration of the operation of the ORTC layer with reference to the underlying communication platform. In the illustrative embodiment of FIG. 3, web clients 302A and 302B are clients (e.g., web browsers rendering web pages from web server 306) connected to interactive event 325. The interactive event may be, for example, an online auction related to a particular product that is hosted by web server 306. As indicated above, a unique ORTC layer operates as an abstraction layer between the web clients and underlying communication platform 310. In one embodiment, each web client interfaces with the ORTC layer using an ORTC API (or ORTC interface call). In illustrative embodiments, the ORTC APIs are embedded HTML pages corresponding to the web pages rendered on the web clients. When the corresponding web pages are rendered by browsers in web client 302A, the embedded ORTC interface 304A invokes an interface with the ORTC layer, thus causing the web client to be ORTC enabled. As will be explained in further detail below, when each web client establishes connection with the interactive event hosted by the web server, the embedded ORTC interface enables translation of the connection request and also causes certain listen channels to be established to be able to receive status updates that may be broadcast by other web clients.

Similarly, web client 302B includes an embedded ORTC API 304B to enable web client 302B to be connected to underlying communication platform 310. Each ORTC API or interface causes web client to invoke a connection to the ORTC layer. ORTC layer, invoked as a result of the ORTC API in each client page, translates connection requests (i.e., request to connect to interactive event 325) underlying communication platform 310 (e.g., HTML5 Web Socket). In embodiments, the ORTC APIs also cause listen channels to be established for each connected web client. Such listen channels are established in the underlying communication platform, and are configured to receive updates about changes in status caused by any of the web clients.

Similar to the clients having an interface to the ORTC layer through ORTC APIs, the web server 306 may also additionally include an API 304C to the ORTC layer. Configured in such a manner, the web server may also have a listen channel to receive updates regarding status change events that affect the interactive event, and create logs or make changes as necessary. In embodiments, the server-side API is meant to be used embedded in, for example, Microsoft's .NET applications (via C# or VBScript languages) or J2EE applications (via Java language). Exemplary illustrations of ORTC client-side API functions are provided below:

```
Connect:
ORTC.Broadcast.Connect('wss://realtime.domain.com:443/aq', '', '', {'onMessage': function (headers, body) {
processSTOMPMessage(headers, body) }})
Subscribe:
ORTC.Broadcast.Subscribe('/topic/ciberStore/Demos/Movement');
Broadcast:
ORTC.Broadcast.Sendmessage('{ "left": "' + coord.left + 'px", "top": "' + coord.top + 'px" }' ,
'/topic/ciberStore/Demos/Movement');
```

It is noted though, at least in some embodiments, the client side ORTC APIs may be sufficient to establish the full duplex communication in updating the status of the interactive event with respect to each participating web client. For example, in some embodiments, each web client has an open listen channel established via interfaces to the ORTC layer. When one of the web clients broadcasts a message indicative of a change in status, the broadcast message is transported within the underlying communication platform and directly captured by each of the open listen channels without requiring a specific push event from the web server 220.

Figure 4:
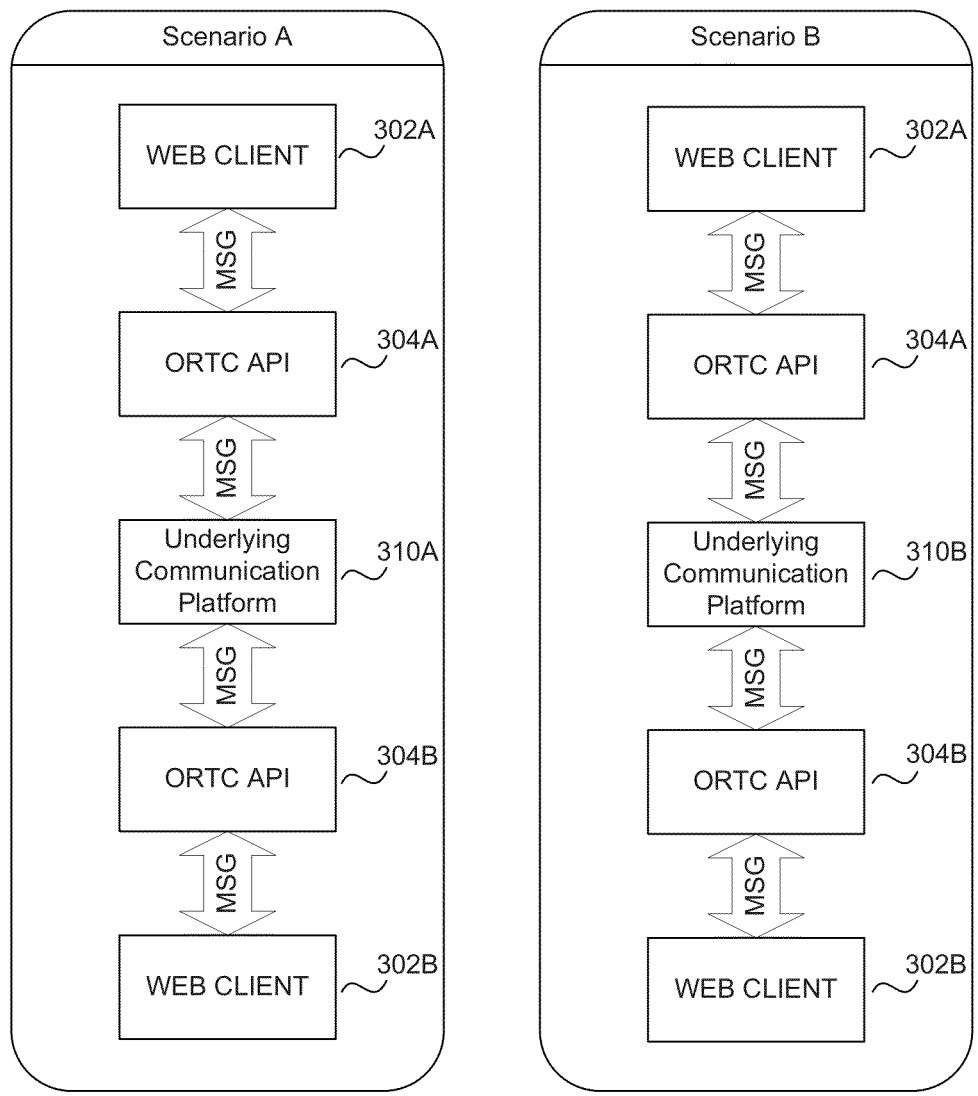
FIG. 4 provides block diagrams illustrating use of different types of underlying communication platforms in conjunction with the ORTC abstraction layer.
Figure 5:
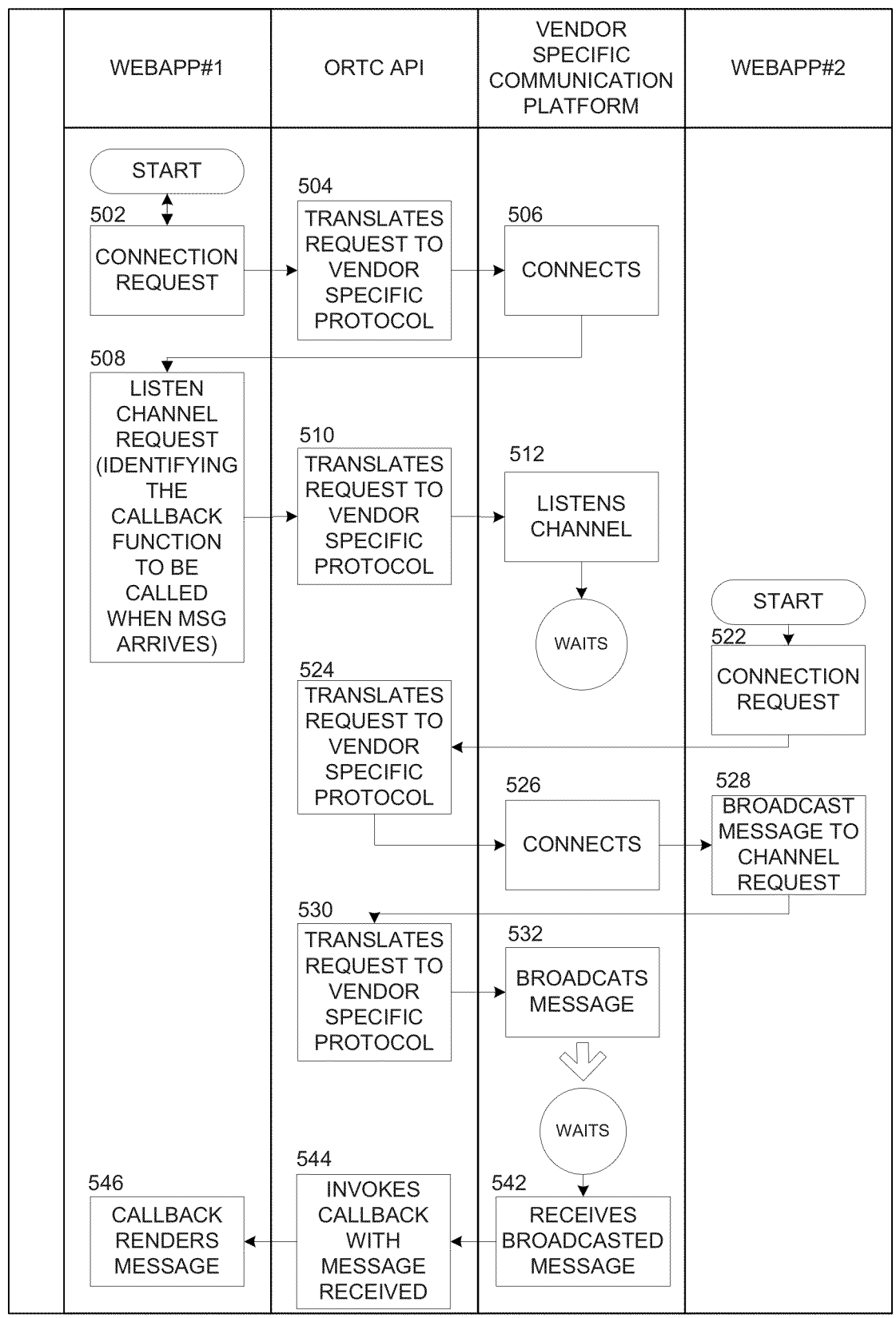
FIG. 5 depicts a data flow between two ORTC enabled web applications.

As discussed in the above sections, one of the advantages of the ORTC layer abstraction is the ability to allow an application (e.g., a web client) to interact with other applications in real-time over standard web ports (e.g., ports 80 and 443) without the applications being tied to a specific type of underlying communications platform. If the underlying communications platform needs to be changed for some other platform having an ORTC implementation, that change is accommodated without any change in the application's source code. FIG. 4 represents such a scenario. In scenario A, web clients 302A and 302B communicate using underlying communication platform 310A. The communication is effectuated by translation through the ORTC abstraction layer (through ORTC interfaces 304A and 304B). Scenario B represents a situation where the underlying platform 310A is substituted for underlying platform B. Due to the presence of the ORTC abstraction layer, the source code or architecture of the web clients remain intact, allowing the underlying platform to be easing switched.

Using the ORTC abstraction layer not only provides freedom of choice from several real-time communication platform vendors, but also ensures that the application will be isolated from future evolutions in the underlying protocols, meaning that a new future full-duplex web communication technology (i.e., underlying communication platform) can be deployed without changing the application, thus drastically reducing the cost of upgrading and maintaining the web server.

In embodiments, the function of the ORTC layer is to translate requests (e.g., connection requests, update requests, response requests, etc.) that either emanate from the web client to a protocol that is discernable by the underlying communication platform. The ORTC layer comprises code necessary for performing the various operations (e.g., translating a connection request from a web client to the underlying communication protocol, receiving a broadcast message and identifying a specific call back function to invoke in a web client in response to the broadcast message, etc.). It is understood that such code may be implemented in any language or structure as may be understood by a person of ordinary skill in the art.

For purpose of further illustration, it is useful to consider the techniques explained herein as it applies to auction web site. Of course, however, it should be noted that the techniques introduced here extend to other interactive web events such as, for example, stock updates, news updates, e-commerce content publishing (personalized promotions based on user preferences), user actions trackers for online help, distributed computation of complex algorithms (e.g., weather forecast models) using the processing power of several computers communicating with each other in full-duplex mode over the web, etc.

FIG. 4 is a flow diagram illustrating the data flow between two ORTC enabled web applications, using an auction web site as example. For illustration, a first web client, WEBAPP#1 represents a user using a web browser to follow the bids of an item in auction web site (i.e., an interactive event hosted by a web server hosting the auction web site). WEBAPP#1 starts by sending a connection (at step 502) request through the ORTC interface (e.g., an ORTC API). In embodiments, the ORTC API translates (at step 504) the request to a protocol specific to or compatible with an underlying communication platform (e.g. HTML5 WebSocket Gateway) that is endemic to the web server (i.e., an underlying communication platform used by the web server in implementing, for example, the interactive session). The ORTC API then connects (at step 506) WEBAPP#1 to the underlying network infrastructure (i.e., the underlying communication platform). The ORTC API can be viewed as an interface to the ORTC layer (i.e., a suite of functionalities that represent the various ORTC features). Accordingly, each web client may be viewed as having an interface or a "call" function to the unique ORTC layer. In other words, each ORTC API represents a link or an interface to the unique ORTC layer that behaves as an abstraction layer between the web client and the underlying communication platform.

When the connection request is acknowledged (i.e., after WEBAPP#1 has been connected to the interactive event), WEBAPP#1 sends (at step 508) a listen channel request through the ORTC API identifying a local function (e.g. Javascript function) that must be invoked within WEBAPP#1 when a new message arrives. The ORTC API then translates (at step 510) that request to the selected vendor specific protocol (i.e., a protocol specific to the underlying communication platform). The listen channel thus established (at step 512) starts listening for new messages sent to the selected channel through the underlying network infrastructure.

While WEBAPP#1 is waiting for a new message to arrive (e.g., a new bid on the selected item), WEBAPP#2 (e.g., another user browsing the same item selected by WEBAPP#1) sends a similar connection request (at step 522) through the ORTC API. Again, the ORTC API here could be viewed as WEBAPP#2's specific interface with the ORTC layer. Just as with WEBAPP#1, the ORTC API linked with WEBAPP#2 translates (at step 524) the connection request to the selected vendor specific protocol, thus connecting (at step 526) WEBAPP#2 to the underlying communication platform.

Consider a scenario where WEBAPP#2 decides to place a new bid on the selected item after the connection request is acknowledged. WEBAPP#2 may do so by clicking on the BID button of the auction website GUI. In embodiments, an event handler of the BID button (in WEBAPP#2) causes a broadcast message request (at step 528) through the ORTC API. In some instances, the broadcast message contains the new bid value and associated user ID. The ORTC API translates (at step 530) that request to the selected vendor specific protocol (i.e., a protocol compatible with the underlying communication platform). The ORTC API then transmits or broadcasts (at step 532) the message through the underlying network infrastructure raising a "message received" event at the ORTC new message handler. The broadcast message is now effectively available through the underlying platform and available for pick up by each of the connected listen channels.

The ORTC handler, with information about an existing broadcast message available in the underlying communication platform (at step 542), invokes (at step 544) WEBAPP#1's new message callback function. In embodiments, the ORTC handler invokes (at step 546) the callback function for every connected web client (i.e., ever client following the selected auction item and thus listening to the selected channel), passing the received message as an input parameter. It is then the job of the callback function to parse the received message and update the appropriate GUI component with the new bid, rendering it for the user a split second after it was placed by another user, thus maximizing the speed of new data updates and minimizing the web server load and bandwidth.

The above description illustrated an illustrative embodiment where only the client side ORTC APIs were involved in effectively communicating and updating changes in status updates to the interactive event hosted by the web server. In embodiments, an ORTC enabled server service would also be listening the bids channel (thus receiving the new bids message as they are broadcasted) in order to save them at a local SQL database for data persistence and logging and other purposes as can be envisioned by a person of ordinary skill in the art.

Security

For most of the websites such as new websites, the full-duplex communications are real-time public communications. In these applications, the use of user passwords for security purposes is not applicable since any anonymous user should be able to access the real-time information fed by the websites.

In one embodiment, an authentication server is provided to generate a unique connection id represented by a token and post this token with its channel permissions (such as read, write or read/write permissions) to the underlying real-time communications platform, enabling it to accept or reject messages coming from the associated user's web-browser or client application.

Because the post is made from server to server (the authentication server and the real-time server), it's easy to obtain high security through the use of encryption algorithms performed at the authentication server through the computation of a connection key, which can later be validated to ensure the connection and its messages were not tampered by a non-validated client.

Within the scenario, the user may stay anonymous to the website but its real-time connection (even if using a pre-defined set of permissions set generally to the anonymous user profile) would be secure since its computed key would be unique.

Anyone sniffing the network could obtain its key but the connection to the real-time server would fail since the new connection id would compute a different key thus enabling the server to reject the tampered connection.

Figure 6:
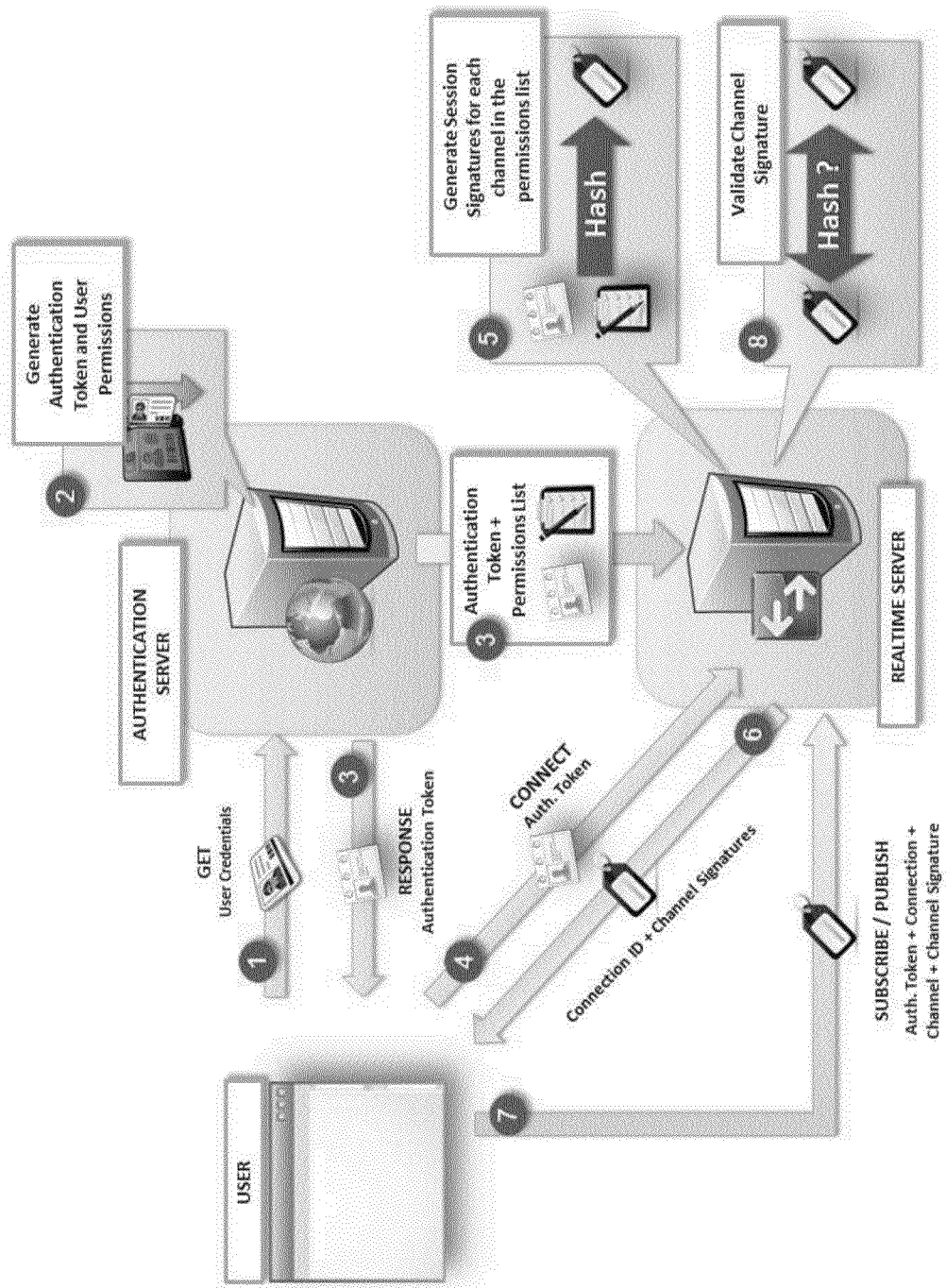
FIG. 6 depicts a sample security model for ORTC communications.

FIG. 6 depicts a sample security model for an ORTC layer. The user starts the communication by requesting the Authentication Server (AUTHS) its authentication token based on its user credentials (step 1), which can be anonymous or based on its credential such as a user id/password for a private access of the site.

Based on the user credential, the AUTHS will profile the user and generate the authentication token and list of permissions (step 2) for the selected profile, such as permissions as reader, publisher, premium user, etc.

In step 3, the authentication token and permissions list are sent by the AUTHS to the Real-Time Server (RTS) through a TLS/SSL POST (HTTPS), and are saved at the RTS internal database. In addition, the user authentication token is sent back to the user as the response of its request in Step 1.

Upon the reception of the authentication token, the user sends the connect message to the RTS (Step 4) passing the authentication token as parameter. In response, RTS can assign a unique connection id to the connection, generate the signature for each allowed channel (Step 5) and send the channel signature back to the user along with its connection id (Step 6).

The generated signatures at Step 5 include the connection id so that different connections (from different users) will always have different signatures even if those users profiles are the same and therefore have the same permissions set. The hashing algorithm is unknown by both user and AUTHS preventing them from generating valid signatures outside the scope of the RTS.

In Step 7, the user has its connection id and channel signatures. The user can subscribe and publish to channels (for the real-time information feeds) along with the appropriate channel signature, its authentication token, connection id and channel name. At step 8, the RTS computes the channel signature based on the user supplied information. If this computed channel signature is different from the channel signature transmitted along with the subscribe/publish command by the user, the tampered connection is recognized and the command will fail. On the other hand, if both hashes match then the connection is valid and the command is performed.

For example, considering a typical media website scenario where there's a publisher allowed to send messages to readers (write permission) and readers that don't have permission for sending messages, but only have permission for receiving the messages (read permission). Each message sent by the publisher to a specific channel (e.g. sports news) represents a news alert, alerting the connected readers in that channel to read the details of the news content. If there was no security system in place ensuring that readers can't send messages, any reader could impersonate the publisher and send a fake news alert to all the other readers, which would represent a tremendous security breach of the website content management system.

In this scenario, the publisher may use a password protected website (backoffice) enabling him to write the content of the new alert, publish it to the RTS platform and send the real-time alerts to connected users. When he logs in, the AUTHS will generate an authentication token with a permissions list enabling the token to write to channels and send it to the RTS. Later when he publishes the news alert, his browser will send a message containing his connection id, his token, the appropriate channel signature, the news title and URL to the RTS, which will validate his channel signature and broadcast the news title and URL to all the users being connected to (subscribing) the channel in which the news alert was published.

On the other hand, when an anonymous user enters the website, the webserver (here also assuming the role of AUTHS) will generate an authentication token with a permissions list enabling the token only to read (receive) from channels and send it to the RTS. Afterwards, his browser will send a subscribe message to the RTS containing his connection id, his token, the channel being subscribed and the appropriate channel signature in order to receive the real-time news alerts. As soon as a publisher sends a valid news alert, the title and URL of the alert will be rendered at the user's browser.

If this anonymous user sends, a publish message to the RTS using his channel signatures, the RTS will not accept the message since the user's channel signature is not valid for writing or publishing, but valid only for reading. This way the website can offer the benefits of real-time broadcasting with safety, and be sure that only its logged publishers will be able to broadcast messages.

Scalability

Due to the persistent nature of the real-time communications, it is fairly easy to saturate the servers and central message bus capacity of websites with a large audience of millions of users. Most horizontal scalability solutions with a common message bus is not enough in these cases, since the common backend easily becomes a bottleneck and a single point of failure.

In one embodiment, there is a distributed network topology of independent nodes that could relay the real-time messages coming from its connected users to its neighbor nodes, which in turn would relay the messages to their connected neighbor nodes. This recursive process would be repeated until there are no more nodes to relay to in the network.

Figure 7:
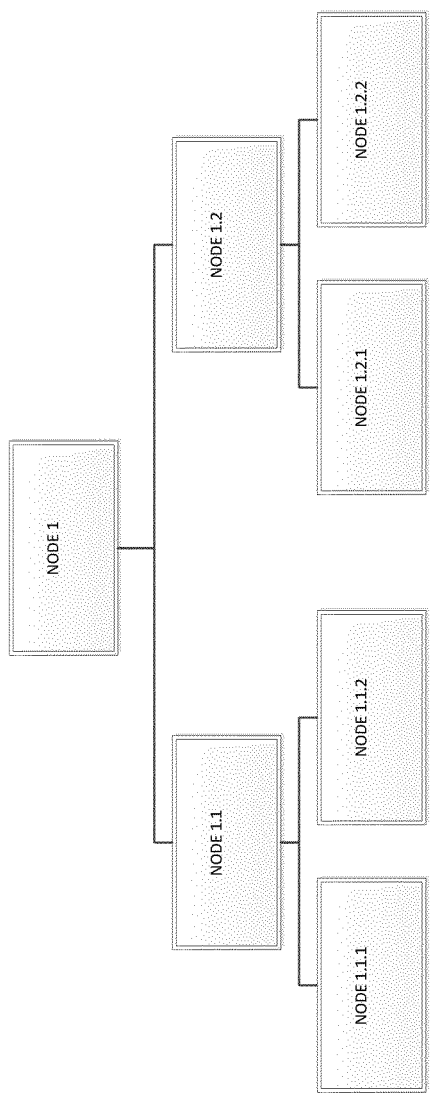
FIG. 7 depicts a sample binary tree topology for ORTC communications.

FIG. 7 depicts a possible scenario in which a binary tree topology is used. In this topology a node has a maximum of two children and one parent (except for the top-level node which has no parent).

According to FIG. 7, a message from NODE 1.1.1 to NODE 1.2.2 would have the following relay pattern: NODE 1.1.1 to NODE 1.1 to NODE 1 to NODE 1.2 to NODE 1.2.2.

In this scenario, there is no common message bus to saturate and if one specific network node collapses that wouldn't stall the entire network but only some branches of it such as the nodes dependent upon the collapsed node. In contrast when a common message bus collapses, the entire network collapses without delivery of even a single message.

In order to save bandwidth and minimize the computational effort of relaying messages, an optimized relay algorithm would be in place insuring that each message is only relayed to the neighbor nodes with users who are interested in the type of message.

Also in order to minimize the latency of message delivery, a balancing algorithm would be in place insuring that users with similar interests would be connected to nodes "near" each other in the network topology thus minimizing the number of relays each message undertakes from emitter to receiver (the least the hops or relays the faster the message is delivered).

In order to make possible the development of a balancing algorithm described in the previous paragraph, the publish/subscribe model (PUB/SUB) would be used by the nodes to express interest in receiving a given content type (subscribing a channel, e.g. sports news) and to express interest in publishing a message of a given content type.

For example, NODE 1.2.2 in FIG. 7 has a connected user interested in receiving alerts about sports news. This user would express his interest by sending a subscribe message to NODE 1.2.2 stating he wants to subscribe the sports news channel. Upon the reception of this subscribe message, NODE 1.2.2 would relay the subscription to its parent, NODE 1.2, which in turn would relay to its parent NODE 1. The relaying process would stop at NODE 1 since it has no parent.

Then imagine NODE 1.1.1 has a connected user, a publisher, that sends a message to the sports news channel with a breaking news title and URL. NODE 1.1.1 would ask its parent (NODE 1.1) if it has any interest in a sports news message, who in turn would ask its parent (NODE 1) if it has any interest in a sports news message. NODE 1 would send a positive interest answer to its child NODE 1.1 because it has a subscription for the sports channel relayed by its child NODE 1.2.

Upon the reception of interest from NODE 1, NODE 1.1 would also send a positive answer to its child NODE 1.1.1, who would then relay the message published by the user to NODE 1.1. NODE 1.1 would then relay the message to NODE 1, who would relay the message to NODE 1.2 and subsequently to NODE 1.2.2, reaching the subscribed user referred in the previous paragraphs.

An intelligent and optimized cache system would be in place inside each node, enabling it to remember the interests of its parent and children, thus minimizing the interest requests issued to neighbor nodes. Also nodes should know which neighbors they should notify when they no longer have interest in a given channel due to no longer having users interested in it, because they have unsubscribed the channel or because they have disconnected.

The ORTC Scalability Model implements the binary tree of nodes described previously along with an optimized cache system algorithm described as follows:

Used notation:
$x_{n+1}$: the subscript n+1 represents the parent of level n
$x_{n-1}$: the subscript of n−1 represents a child of level n
$P_n^b$: The publish endpoint (network socket) at level n, branch b
$S_n^b$: The subscribe endpoint (network socket) at level n, branch b
$I(c)_n^b$: Interest of branch b of level n for the channel c
$I(c)_{n+1}$: Interest of level n parent for the channel c
$AI(c)_{n-1}^b$: Answer to a Askinterest from child at branch b of level n
$\bar{b}$: The branch opposite to b
for s ∈ {0,1} : iterates s for each element of set {0,1}
→: subscription
⇸: unsubscription

| Sub(c, b)$_n$ | |
|---|---|
| At the tree level n the child of branch b has subscribed channel c | |
| if $I(c)_{n-1}^b = 1$ then return | Child is already interested which means that this subscription was already made, do nothing. |
| $P_{n+1}^b$ ⇸ $S_n^b$ at channel c<br>$I(c)_{n-1}^b = 1$ | Child subscribes parent at branch b<br>Saves child interest in channel c |
| if $I(c)_{n-1}^{\bar{s}} = 1$ or<br>$AI(c)_{n-1}^{\bar{s}} = 0$<br>then | Now that both children are interested in c or the child not responsible for the current subscribing has asked for interest |

| | |
|---|---|
| $P^{\bar{s}}_{n-1} \to S^{\bar{s}}_n$ at channel c  NotifyInterest$\overline{c,(b)}_{n-1}$  Sub(c, b)$_{n+1}$ | in c and the answer was 0, then subscribe to the child not responsible for the current subscribing and notify interest  Relay subscription to parent |

| NotifyInterest (c, b)$_n$ Parent of level n is interested in channel c ||
|---|---|
| l(c)$_{n+1}$ = 1 if Al(s)$_{n-1}^b$ = 0 then $P^s_{n-1} \to S_n^s$ at channel c NotifyInterest(c, s)$_{n-1}$ for s ∈ {0,1} | Parent is interested, subscribe to channel c at the children that previously asked for iinterest n channel c and notify them of interest |

| Pub (c, b, m)$_n$ At tree level n the child of branch b has a message m to publish at channel c ||
|---|---|
| if b <> null and l(c)$_{n+1}$ = 1 then Pub (c, b, m)$_{n+1}$ if b <> null and $l(c)^{\bar{s}}_{n-1}$ = then Pub(c,null, m)$_{n-1}$ if b = null then Pub(c, null, m)$_{n-1}$ where 1(c)$_{n-1}^s$ = 1 for s ∈ {0,1} if b <> null and l(c)$_{n+1}$ = null then l(c)$_{n+1}$ = AskInterest(c,b)$_{n+1}$ if l(c)$_{n+1}$ = 1 then Pub(c, b, m)$_{n+1}$ | The parent is interested in channel c and message is not from parent so just publish message m upstream The other sibling is interested in channel c so just publish message m downstream on the opposite branch If the message comes from the parent publish it downstream to the interested children If the message doesn't come from the parent ask the parent its interest in channel c and if it's interested publish the message m upstream |

| AskInterest(c, b)$_n$ The child b of level n requests the interest for channel c ||
|---|---|
| if l(c)$_{n+1}$ = 1 or $l(c)^{\bar{s}}_{n-1}$ = 1 then $P^b_{n-1} \to S_n^b$ at channel c Al(c)$_{n-1}^b$ = 1 return(1) Else if has Parent and l(c)$_{n+1}$ = null then l(c)$_{n+1}$ = AskInterest(c, b)$_{n+1}$ if 1(c)$_{n+1}$ + 1 then $P^b_{n-1} \to S_n^b$ at channel c Al(c)$_{n-1}^b$ = l(c)$_{n+1}$ [return (l(c)]$_{n+1}$) Else Al(c)$_{n-1}^b$ = 0 return(0) | The parent or the other sibling (the other branch) is interested in channel c so this child is also interested. Subscribe to child b and return positive interest. Otherwise ask the interest of the parent (if any) and return its interest. |

| NotifyRestart (b)$_n$ Neighbor of level n notifies restart ||
|---|---|
| if b = null then l($\square$)$_{n+1}$ = null Sub(x, b)$_{n+1}$ for x ∈ {P$_{n+1}^b \to S_n^b$} if ∃ Al()$_{n-1}^x$ then notifyRetart(x)$_{n+1}$ for x ∈ {0,1} if b <> null then l($\square$)$_{n-1}^b$ = null Al ($\square$)$_{n-1}^b$ = null | Reset all saved interests related to the neighbor issuing the notification. If the notification comes from parent reissue every subscription sent to parent. Forward the restart notification for every child where in the past there was at least one saved answer of interest. |

| Unsub (c, b)$_n$ At the tree level n the child of branch b has unsubscribed channel c ||
|---|---|
| if $l(c)^{\bar{s}}_{n-1}$ = 0 then $P^b_{n+1} \to S_n^b$ at channel c Unsub(c, b)$_{n+1}$ l(c)$_{n-1}^b$ = 0 | If the other child also has no interest in channel c, unsubscribe from parent at channel c and forward unsubscription to parent. |

| | |
|---|---|
| if $Al(c)^{\bar{s}}_{n-1}$ = 1 or $Al(c)^{\bar{s}}_{n-1}$ = 0 then $P^{\bar{s}}_{n-1} \to S^{\bar{s}}_n$ at channel c NotifyLackOfInterest$\overline{c,(b)}_{n-1}$ | Saves child lack of interest in channel c If the child not responsible for the current unsubscribing has asked for interest in c, then unsubscribe to the child not responsible for the current unsubscribing and notify lack of interest |

| NotifyLackOf Interest (c, b)$_n$ Parent of level n is no longer interested in channel c ||
|---|---|
| l(c)$_{n+1}$ = 0 if Al(s)$_{n-1}^b$ = 0 or Al(s)$_{n-1}^b$ = 1 then $P_{n-L^s} \to S_n^s$ at channel c NotifyLackOfInterest(c,s)$_{n-1}$ for s ∈ {0,1} | Parent is no longer interested: unsubscribe to channel c at the children that previously asked for interest in channel c and notify them of lack of interest |

| Start (b)$_n$ Children of branch b started (or restarted) ||
|---|---|
| Unsub(x, b)$_{n+1}$ for x ∈ {l($\square$)$_{n-1}^b$} l($\square$)$_{n-1}^b$ = null | Unsubscribe from parent for every channel my previous child in branch b had interest in (if any). Clear my previous child interests for branch b |

In order to illustrate the algorithm, the network topology of 7 may be utilized along with the following commands executed in the presented order:

C1: NODE 1.1.1 subscribes channel A
C2: NODE 1.1.2 publishes message X to channel A
C3: NODE 1.2.2 publishes message Y to channel A The final expected results of this commands would be the following:

R1: NODE 1.1.1 receives message X
R2: NODE 1.1.1 receives message Y

Figure 8:
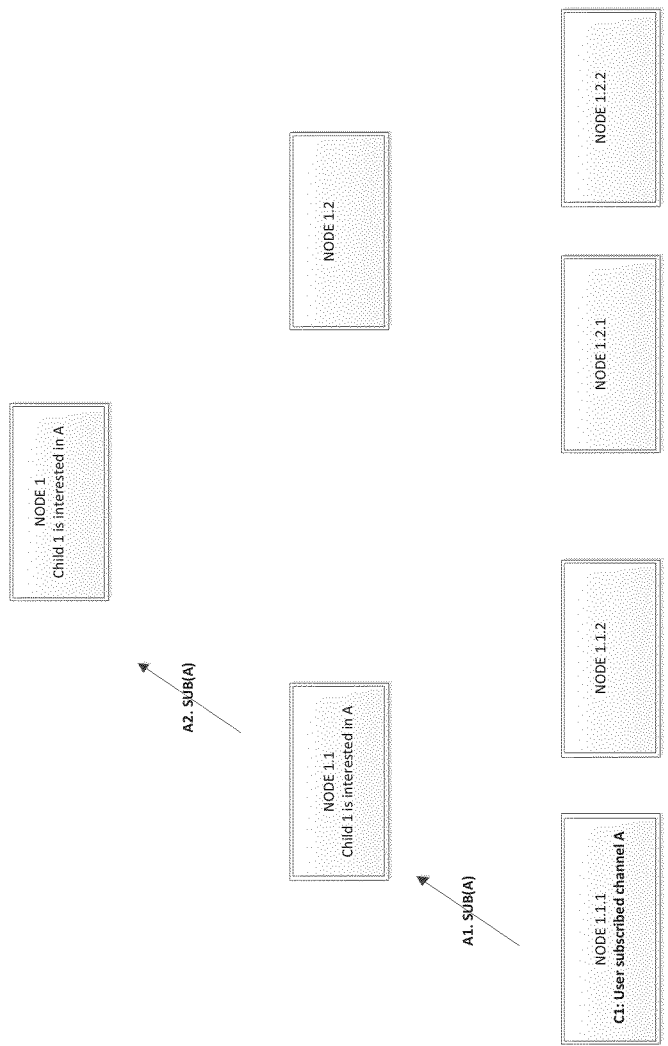
FIG. 8 depicts a node subscribing to a channel during ORTC communications.

The detailed node interactions of the command C1 are depicted in FIG. 8. Due to the reception of command C1, NODE 1.1.1 performed action A1 relaying the subscription command to NODE 1.1 which then cached information of that child 1 is interested in channel A and relayed the subscription command to its parent (NODE 1) in command A2.

Figure 9:
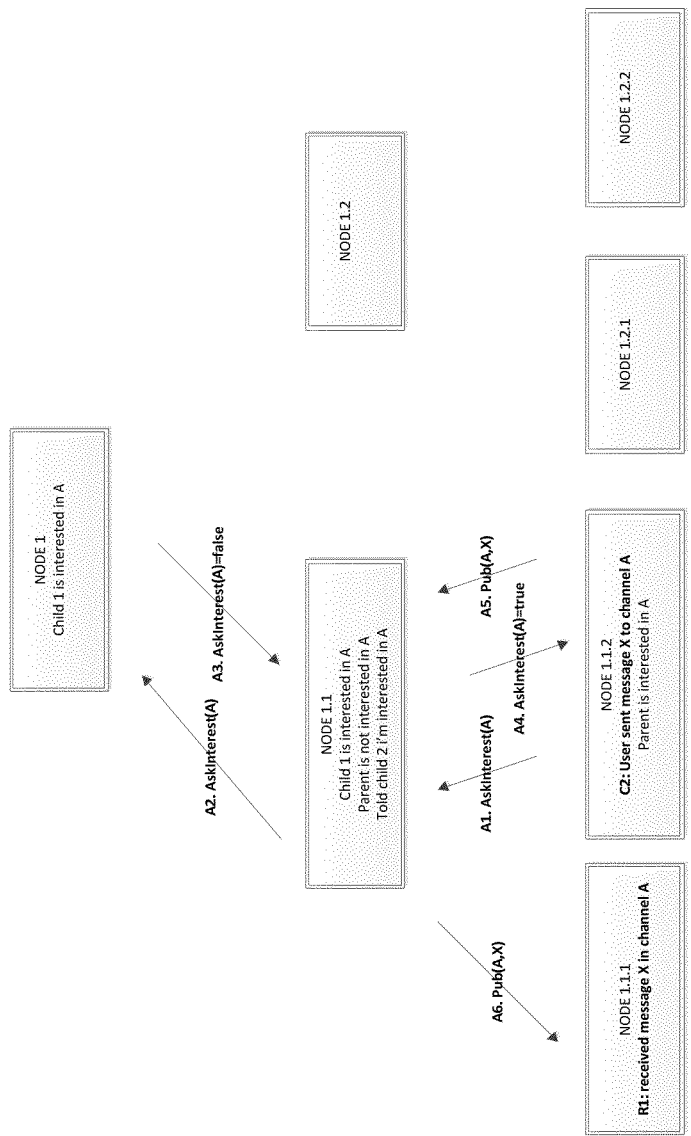
FIG. 9 depicts a node publishing to a channel during ORTC communications.

The detailed node interactions of the command C2 are depicted in FIG. 9. NODE 1.1.2 received command C2 from a user wanting to publish message X to channel A. NODE 1.1.2 asks its parent for its interest in channel A (A1). Since NODE 1.1 doesn't know the interest in A of its parent (NODE 1) sends an AskInterest message (A2). The only NODE 1 child that's interested in A is the one asking (NODE 1.1), so NODE 1 will reply that it has no interest in channel A (A3). But since child 1 of NODE 1.1 has previously stated its interested in channel A (command C1), it will reply a positive interest in A to child 2 (A4).

Upon the reception of A4, NODE 1.1.2 knows its parent has interest in A, so it will cache this interest (so it doesn't have to ask again until it receives a lack of interest notification). As a result of this, positive interest it will send message X "upstream" to its parent (A5).

NODE 1.1 receives message A from NODE 1.1.2. Because it knows child 1 (NODE 1.1.1) has interest in A, it will relay message X "downwards" to NODE 1.1.1 (A6). It won't relay "upwards" to its parent (NODE 1) because it knows it doesn't have any interest in channel A.

As a result of A6, NODE 1.1.1 receives message X to channel A (the desired result R1) and broadcasts message X to all its connected users subscribing channel A.

If command C2 is performed again (by a different user connected to NODE 1.1.2), only action A5 and A6 will be performed since nodes 1.1.2 and 1.1 will use their internal cache of neighbor interests to decide the relays to perform resulting in bandwidth and computational resources saving, thus increasing the performance of the overall network.

Also notice that branch 1.2 has not received any message or notification from branch 1.1, since there are no users connected with interest in channel A. The ORTC relaying algorithm is optimized and only relays messages to nodes that will do something useful with them therefore not wasting bandwidth and computational resources.

Figure 10:
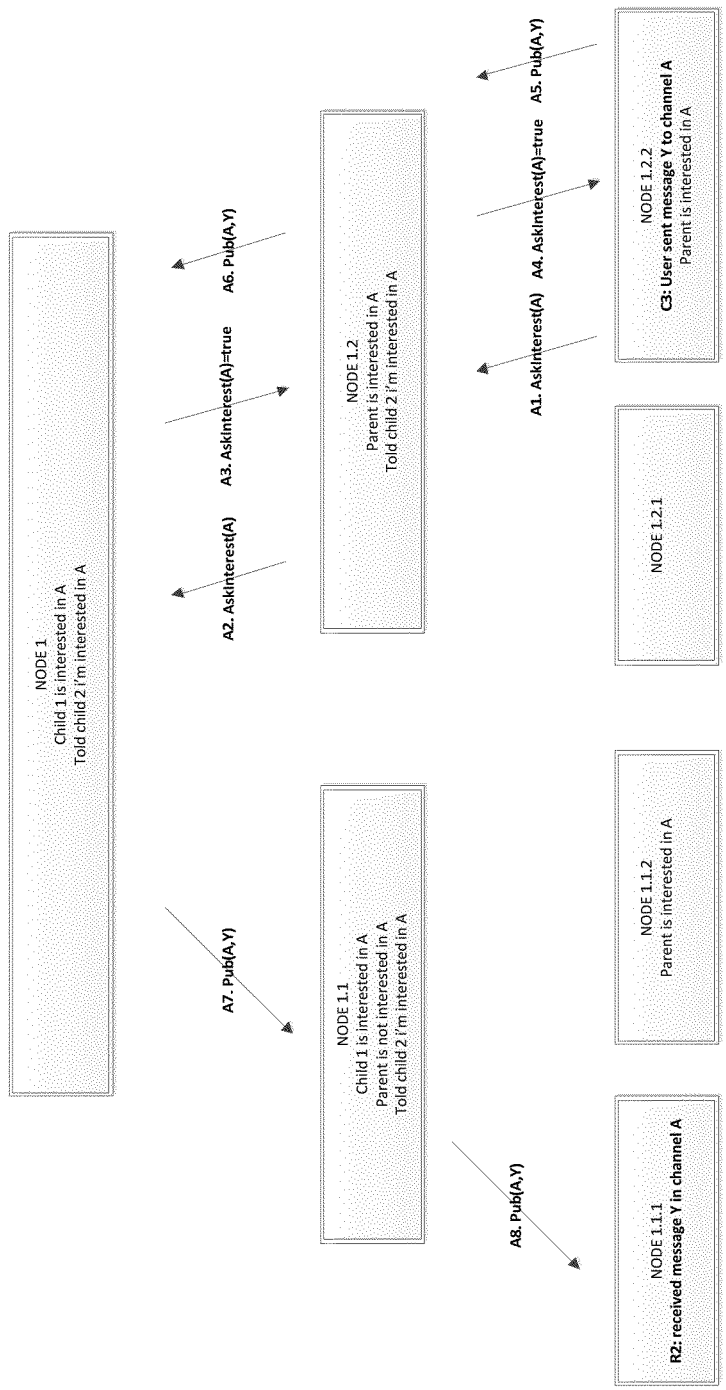
FIG. 10 depicts another node publishing to a channel during ORTC communications.

FIG. 10 depicts the actions details for command C3 in which NODE 1.2.2 publishes message Y to channel A.

NODE 1.2.2 receives message Y to channel A from one of its connected users. Since it doesn't have in its internal cache information about the interest of its parent in channel A, it will send an AskInterest message to its parent (A1).

NODE 1.2 receives the message of A1 and since it doesn't have in its internal cache information about the interest of its parent in channel A. NODE 1.2 sends an AskInterest message to its parent (A2).

NODE 1 receives the message of A2. Since it knows from its internal cache that its child 1 is interested in A, it will reply a positive interest in channel A to its child NODE 1.2 (A3).

At the same time it will save this positive answer in its internal cache. If in the future there's no more interest in channel A due to receiving an unsubscribe message, the node sends a NotifyLackOfInterest message to the children it previously sent positive interests.

Now NODE 1.2 knows that its parent is interested in channel A, so it saves this information in its internal cache and sends a positive interest reply to the child requesting it (A4).

It's now time to NODE 1.2.2 to save its parent positive interest in its internal cache and relay message Y "upwards" to it (A5). NODE 1.2 knows its parent is interested in A so it will also relay message Y "upwards" to it (A6).

NODE 1 knows its child 1 is interested in channel A, so it will immediately relay message Y "downwards" to NODE 1.1 (A7) which will do exactly the same, relaying message Y to NODE 1.1.1 in action A8 (it knows from its internal cache that its child 1 is interested in A).

As a result of A8 NODE 1.1.1 receives the message Y sent by NODE 1.2.2, which is the expected result R2. And NODE 1.11. broadcasts it to every connected user subscribing channel A.

Allowing command C3 to be performed at NODE 1.2.2 is not an optimized option, since messages in channel A have to cross several network nodes in order to reach interested users at NODE 1.1.1

It is the responsibility of the ORTC optimized load balancer to insure that users willing to send messages through channel A will be connected "near" to users subscribing channel A (load balancing with channel affinity). This means that in the previously portrayed scenario the user performing C3 should be connected to NODE 1.1.1 or NODE 1.1.2.

If this is the case, C3 will only cause network interactions at branch 1.1 therefore saving bandwidth and computational resources at the top node and at the entire branch 1.2 while achieving the intended result R2.

Due to the recursive nature of the presented algorithm the network can have as many nodes as necessary, therefore providing unlimited scalability. It also guarantees that when adding new nodes there's no need to restart the existing ones thus enabling high availability to the overall network.

The algorithm is also aiming fault-tolerance to sudden node deaths, since when this happens a new node process will be launched by the operating system. This new node will then notify their neighbors (parent and children) that it's a new process with no previous memory (the internal cache is empty due to the restart), allowing the parent and children to use their relevant internal cache to share information with the new neighbor in order to reestablish its internal cache. In this way, the new node can perform its role in the network as if it was always there from the beginning.

As explained, the ORTC scalability model provides optimized message distribution across a load-balanced, highly-available and fault-tolerant network. The model allows the usage of real-time message broadcasting in large websites with millions of concurrent users.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

I claim:

1. A method for establishing web communication among multiple web clients connected to an interactive event hosted by a web server, the method comprising:
    sending from a first web client to a first Open Real-Time Connectivity (ORTC) interface of the web server, a connection request to connect to the interactive event;
    receiving by the first web client a confirmation from an underlying communication platform endemic to the web server through the first ORTC interface, wherein the confirmation indicates that the underlying communication platform has connected the first web client to the interactive event;
    subsequent to the connection of the first web client to the interactive event, establishing a listen channel associating the first web client with the underlying communication platform, via the first ORTC interface, wherein the first ORTC interface enables the listen channel to be implemented in the underlying communication platform;
    receiving an instruction from the underlying communication platform to the first web client through the first ORTC interface, wherein the instruction enables the first web client to update and reflect the status change to the interactive event; wherein the instruction is in response to a broadcast message transmitted by a second web client through a listen channel associated with the second web client in the underlying communication platform; wherein a second ORTC interface associated with the second web client facilitates connection of the second web client to the interactive event via the underlying communication platform, and wherein the broadcast message is indicative of a status change to the interactive event that is induced by the second web client; and
    retrieving by the first web client updates related to status changes to the interactive event directly from the second web client without requiring any update feed from the web server hosting the interactive event.

2. The method of claim 1, wherein the underlying communication platform is a real-time full-duplex web communications platform.

3. The method of claim 2, wherein the communication platform is a HTML5 WebSocket platform.

4. The method of claim 1, wherein the first ORTC interface adds a consistent layer of abstraction between the first web client and the underlying communication platform.

5. The method of claim 4, wherein the added layer of abstraction enables the first web client to operate independent of a type of underlying communication platform.

6. The method of claim 1, wherein said establishing a listen channel further comprises:
    identifying, by the first web client, a local function of the first web client that needs to be invoked when the broadcast message is received; and
    transmitting, by the first web client, a listen channel request through the first ORTC interface, the listen channel request including information related to the local function that needs to be invoked;
    wherein the first ORTC interface translates the listen channel request to a protocol associated with the underlying communication platform to cause the listen channel to operate in the underlying communication platform.

7. The method of claim 1, further comprising:
    prior to receiving the broadcast message transmitted by the second web client, connecting the second web client to the underlying communication platform via the second ORTC interface, wherein the underlying communication platform enables the second web client to be connected to the interactive event.

8. The method of claim 1, further comprising:
    prior to receiving the broadcast message transmitted by the second web client, sending, to the second ORTC interface, an indication from the second web client of an action that induces a status change to the interactive event, wherein the indication includes details regarding the status change;
    wherein the second ORTC interface translates the indication to the underlying communication platform; and
    receiving the broadcast message in response to receiving the indication; wherein the broadcast message is generated within the underlying communication platform.

9. The method of claim 1, further comprising:
    wherein the broadcast message from the underlying communication platform is received by a server ORTC interface being associated with the web server; wherein the server ORTC interface translates the broadcast message to the web server; and
    wherein the webserver records the status change associated with the broadcast message.

10. The method of claim 1, further comprising:
    identifying, in association with the listen channel, a call back function within the first web client, the call back function identifying one or more operations to be invoked upon receipt of the broadcast message; and
    invoking the call back function within the first web client subsequent to receiving the broadcast message.

11. A method for establishing web communication among a plurality of web clients connected to an interactive event hosted by a web server, each of the plurality of web clients having consistent interfaces to an Open Real-Time Connectivity (ORTC) layer for connectivity to an underlying communication platform that enables full-duplex communication between the plurality of web clients and the web server, the method comprising:
    establishing, by the ORTC interface of the web server associated with each of the plurality of web clients, a listen channel for each of the plurality of web clients, wherein each listen channel is for identifying and receiving any broadcast messages that may be generated by a given web client of the plurality of web clients in response to the given web client causing a status change to the interactive event hosted by the web server;

translating, by the ORTC interface associated with each of the plurality of web clients, the listen channel for each of the plurality of web clients to the underlying communication platform, thereby causing each listen channel to operate within the underlying communication platform;

receiving, by at least one of the listen channels, a broadcast message transmitted by the given web client of the plurality of web clients within the underlying communication platform, wherein the broadcast message is indicative of the status change to the interactive event; and communicating, by the ORTC interface associated with the plurality of web clients, an instruction from the underlying communication platform to an associated web client, wherein the instruction prompts the associated web client to update and reflect the status change to the interactive event;

wherein the instruction enables the associated web client to receive updates related to status changes to the interactive event directly from the given web client without requiring any update feed from the web server hosting the interactive event.

12. The method of claim 11, wherein the underlying communication platform is a real-time full-duplex web communications platform.

13. The method of claim 12, wherein the communication platform is a HTML5 WebSocket platform.

14. The method of claim 11, wherein each ORTC interface adds a layer of abstraction between each web client and the underlying communication platform.

15. The method of claim 14, wherein the added layer of abstraction enables each web client to operate independent of a type of underlying communication platform.

16. The method of claim 11, wherein each web client identifies a local function of the web client that needs to be invoked when the broadcast message is received;
wherein each web client transmits a listen channel request through the web client's associated ORTC interface, the listen channel request including information related to the local function that needs to be invoked; and
translating, by each ORTC interface, the listen channel request to a protocol associated with the underlying communication platform to cause each listen channel to operate in the underlying communication platform.

17. The method of claim 11, further comprising:
prior to receiving the broadcast message transmitted by the given web client, receiving, by an ORTC interface associated with the given web client, an indication from the given web client of an action that induces a status change to the interactive event, wherein the indication includes details regarding the status change;
translating, by the given ORTC interface, the indication to the underlying communication platform; and
generating, within the underlying communication platform, the broadcast message in response to receiving the indication.

18. The method of claim 11, further comprising:
receiving, by a server ORTC interface, the broadcast message from the underlying communication platform, the server ORTC interface being associated with the web server;
translating, by the server ORTC interface, the broadcast message to the web server; and recording, by the web server, the status change associated with the broadcast message.

19. A system establishing web communication, the system comprising:
a first web client;
a second web client;
a web server configured to host an interactive event;
a first Open Real-Time Connectivity (ORTC) interface associated with the first web client, the first ORTC interface configured to receive a connection request from the first web client to connect to the interactive event, the first ORTC interface further configured to:
connect the first web client to an underlying communication platform endemic to the web server, wherein the underlying communication platform enables the first web client to be connected to the interactive event;
subsequent to the connection of the first web client to the interactive event, establish a listen channel in association with the first web client, wherein the first ORTC interface enables the listen channel to be implemented in the underlying communication platform;
wherein the listen channel is configured to receive a broadcast message transmitted by the second web client in the underlying communication platform, wherein a second ORTC interface associated with the second web client facilitates connection of the second web client to the interactive event via the underlying communication platform, and wherein the broadcast message is indicative of a status change to the interactive event that is induced by the second web client, and wherein the first ORTC interface communicates the broadcast message from the underlying communication platform to the first web client, and wherein the broadcast message enables the first web client to update and reflect the status change to the interactive event;
wherein the first web client receives updates related to status changes to the interactive event directly from the second web client via the underlying communication platform without requiring any update feed from the web server hosting the interactive event.

20. The system of claim 19, wherein the underlying communication platform is a real-time full-duplex web communications platform.

21. The system of claim 20, wherein the communication platform is a HTML5 WebSocket platform.

22. The system of claim 19, wherein the first ORTC interface adds a layer of abstraction between the first web client and the underlying communication platform.

23. The system of claim 22, wherein the added layer of abstraction enables the first web client to operate independent of a type of underlying communication platform.

24. The system of claim 19, wherein said establishing a listen channel further comprises a sequence of steps performed by the first web client and the first ORTC interface, the sequence of steps comprising:
identifying, by the first web client, a local function of the first web client that needs to be invoked when the broadcast message is received;
transmitting, by the first web client, a listen channel request through the first ORTC interface, the listen channel request including information related to the local function that needs to be invoked; and
translating, by the first ORTC interface, the listen channel request to a protocol associated with the underlying communication platform to cause the listen channel to operate in the underlying communication platform.

25. A system for establishing web communication, the system comprising:
a web server; and
a plurality of web clients connected to an interactive event hosted by the web server, each of the plurality of web clients having an interface to an Open Real-Time Connectivity (ORTC) layer for connectivity to an underlying communication platform that enables full-duplex communication between the plurality of web clients and the web server, wherein:
the ORTC interface associated with each of the plurality of web clients establishes a listen channel for each of the plurality of web clients, wherein each listen channel is for identifying and receiving any broadcast messages that may be generated by a given web client of the plurality of web clients in response to the given web client causing a status change to the interactive event hosted by the web server;
the ORTC interface associated with each of the plurality of web clients translates the listen channel for each of the plurality of web clients to the underlying communication platform, thereby causing each listen channel to operate within the underlying communication platform;
each listen channel receives a broadcast message transmitted by the given web client of the plurality of web clients within the underlying communication platform,
wherein the broadcast message is indicative of the status change to the interactive event; and
the ORTC interface associated with each of the plurality of web clients communicates the broadcast message from the underlying communication platform to the associated web client, wherein the broadcast message enables each web client to update and reflect the status change to the interactive event;
wherein each of the plurality of web client receives updates related to status changes to the interactive event directly from the given web client via the underlying communication platform without requiring any update feed from the web server hosting the interactive event.

26. The system of claim 25, wherein the underlying communication platform is a real-time full-duplex web communications platform.

27. The system of claim 26, wherein the communication platform is a HTML5 WebSocket platform.

28. The system of claim 25, wherein each ORTC interface adds a layer of abstraction between each web client and the underlying communication platform.

29. The system of claim 28, wherein the added layer of abstraction enables each web client to operate independent of a type of underlying communication platform.

30. The method of claim 25, wherein said establishing a listen channel further comprises a sequence of operations performed by the plurality of web clients and their associated ORTC interfaces, the sequence of operations comprising:
identifying, by each web client, a local function of the web client that needs to be invoked when the broadcast message is received;
transmitting, by each web client, a listen channel request through the web client's associated ORTC interface, the listen channel request including information related to the local function that needs to be invoked; and
translating, by each ORTC interface, the listen channel request to a protocol associated with the underlying communication platform to cause each listen channel to operate in the underlying communication platform.

* * * * *